United States Patent
Callaway, Jr. et al.

(10) Patent No.: US 6,745,038 B2
(45) Date of Patent: Jun. 1, 2004

(54) INTRA-PICONET LOCATION DETERMINATION AND TOMOGRAPHY

(75) Inventors: Edgar H. Callaway, Jr., Boca Raton, FL (US); Matthew R. Perkins, Sunrise, FL (US); Qicai Shi, Tamarac, FL (US); Neal K. Patwari, Plantation, FL (US)

(73) Assignee: Motorola, Inc., Schaumburg, IL (US)

( * ) Notice: Subject to any disclaimer, the term of this patent is extended or adjusted under 35 U.S.C. 154(b) by 603 days.

(21) Appl. No.: 09/845,467

(22) Filed: Apr. 30, 2001

(65) Prior Publication Data

US 2002/0168943 A1 Nov. 14, 2002

(51) Int. Cl.$^7$ ............................................. H04Q 7/20
(52) U.S. Cl. ........................... 455/456.1; 455/456.2; 455/41.2; 455/41.3; 455/226; 370/335; 370/342
(58) Field of Search .................. 455/456.1, 456.2, 455/41.2, 41.3, 226.1, 226.2, 65; 370/335, 342, 320, 210

(56) References Cited

U.S. PATENT DOCUMENTS

2002/0094777 A1 * 7/2002 Cannon et al. ............... 455/41
2002/0094778 A1 * 7/2002 Cannon et al. ............... 455/41
2002/0142721 A1 * 10/2002 Souissi et al. ................ 455/41

* cited by examiner

Primary Examiner—Lee Nguyen
Assistant Examiner—Minh D Dao

(57) ABSTRACT

A technique for intra-piconet location determination and tomography is described. This technique uses received signal strength indicator (RSSI) values in conjunction with transmitted power levels to determine the relative location of each device within a small network employing frequency hopped spread spectrum transmission. In addition to the location determination properties of the invention, the geometry of the devices in the network, as well as the path loss information between pairs of devices, may be used to infer the location of absorbers and reflectors within the piconet. This absorption and reflection information may be used in creating the piconet tomography. The approach described in this specification may be applied in conjunction with the Bluetooth wireless Personal Area Network (PAN) specification to determine device locations, mitigate the effects of multi-path, and perform indoor location and security functions, and other application functions requiring cost-effective location determination.

38 Claims, 13 Drawing Sheets

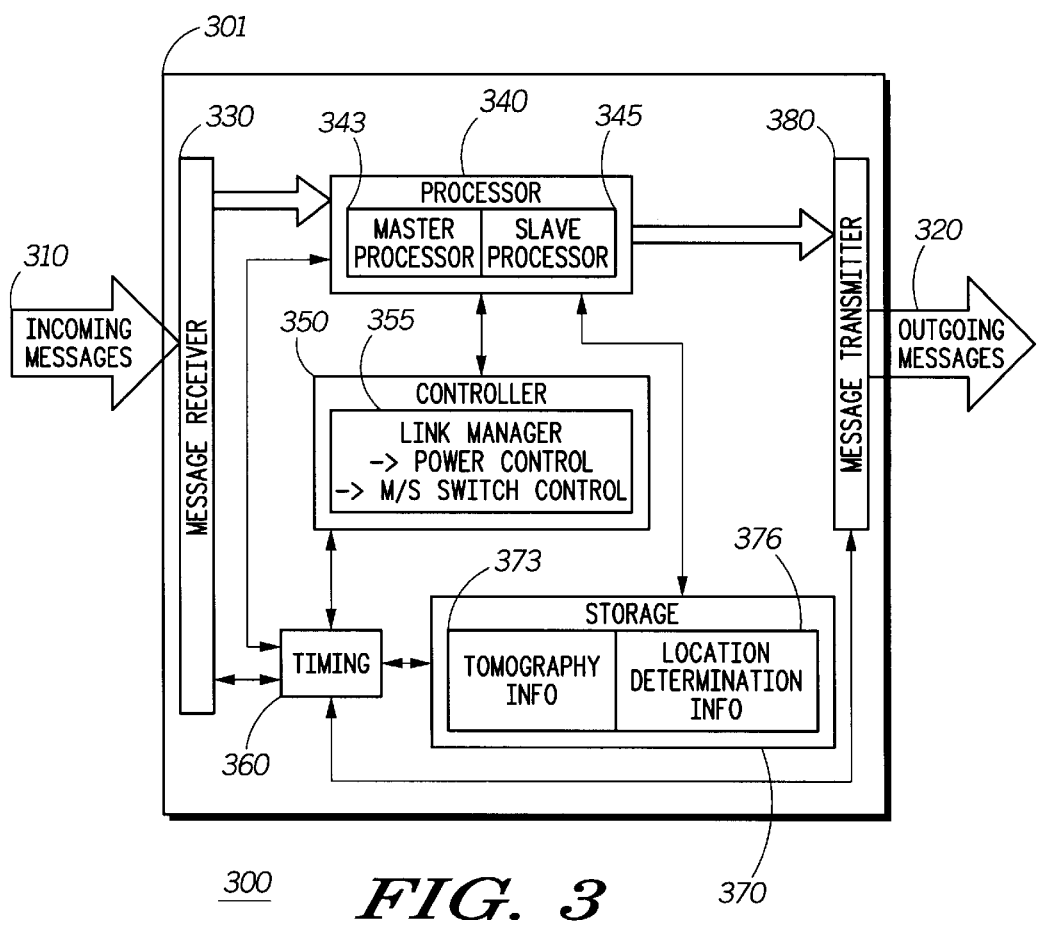
FIG. 3
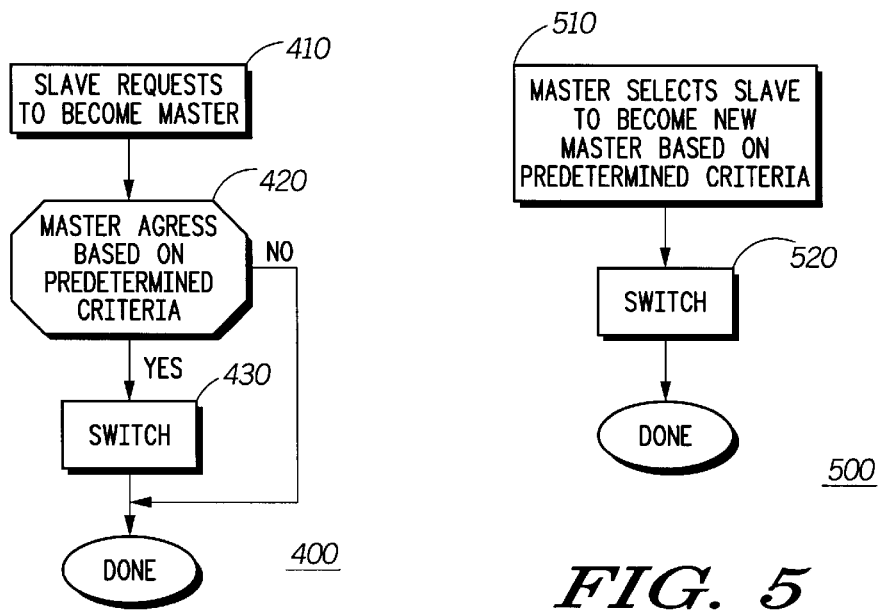
FIG. 4
FIG. 5

INTRA-PICONET LOCATION DETERMINATION AND TOMOGRAPHY

FIELD OF THE INVENTION

The present invention relates generally to communication networks and more specifically to the use of location determination and tomography methods and structures in wireless communication networks.

BACKGROUND OF THE INVENTION

Peer-to-peer network location resolution is an emerging market within the wireless communication arena. New systems are being developed to find people and/or objects, in indoor and outdoor environments. For outdoor environments, there are many solutions that can provide very high-resolution location estimates. In building location solutions, however, techniques are still being researched and developed. Many indoor location determination solutions operate on radio frequency signals and require a dense installation of receivers that can make signal-strength measurements that are used to determine the transmitter's location. Recently, Bluetooth has been considered a viable solution in the quest to define an indoor solution.

Wireless location determination in Personal Area Networks (PANs) is a function receiving increasing attention. A typical application may be physical security: An office has a collection of computers, printers, lab equipment, etc. and the office manager would like to know the location of this office equipment at all times. To date, this has been done with dedicated hardware. However, it is undesirable to purchase specialized security equipment—especially if the security function can be performed by equipment already in the office. It would be desirable to use existing wireless data services to perform this additional function without incurring a reduction of data throughput of the system. Device location determination and resolution in this context is not just limited to device connection status, but also to the physical location of the device within the network.

One application of wireless network technology that shows promise in addressing many of the shortcomings of current wireless PANs in terms of cost, throughput, and scalability is Bluetooth. Bluetooth 1.0B is a specification that describes how small, low-cost, low-power devices communicate with each other to facilitate the exchange of information between two devices without the use of a wired connection. Bluetooth devices exist in a PAN in which each subnetwork, called a piconet, contains a maximum of 8 devices. In each piconet, one device acts as a master and the others serve as slave devices. The devices use frequency-hopped spread-spectrum techniques in order to exchange information. In particular, in the United States, at 2.4 GHz frequency, 79 channels are used in a format determined by the master. Each device pseudo-randomly hops among the 79 channels in order to enable multiple-access communications. The Bluetooth Special Interest Group (SIG) decided to break the standard into two documents. The first is called the Core. It specifies components like the radio, baseband modulation, the link manager, the service discovery protocol, etc. The second document is called the Profiles part. It defines the protocols and procedures that must be adhered to for a variety of Bluetooth applications.

One of the shortcomings of the current wireless PAN solutions is their inability to provide low cost, transparent location determination for devices within the PAN. Ideally, each device within the network should have the ability to determine its connectivity status and physical location within the PAN without the use of specialized and expensive hardware and software. A further benefit of an ideal location determination solution would be to combine location and geometry information from several devices within the PAN to make some estimate of the absorption and reflection environment surrounding the PAN. Ideally, location determination calculations could be performed without a corresponding reduction in data throughput between devices within the PAN.

BRIEF DESCRIPTION OF THE DRAWINGS

The novel features believed characteristic of the invention are set forth in the claims. The invention itself, however, as well as a preferred mode of use, and further objects and advantages thereof, will best be understood by reference to the following detailed description of an illustrative embodiment when read in conjunction with the accompanying drawings, wherein:

FIG. 3 is a block diagram that illustrates the internal device functionality of a representative element of the piconet, according to the present invention.

FIG. 4 is a periodic master-slave switching protocol flowchart, initiated by a slave of the piconet, according to the present invention.

FIG. 5 is a periodic master-slave switching protocol flowchart, initiated by the master of the piconet, according to the present invention.

DESCRIPTION OF THE INVENTION

Figure 1:
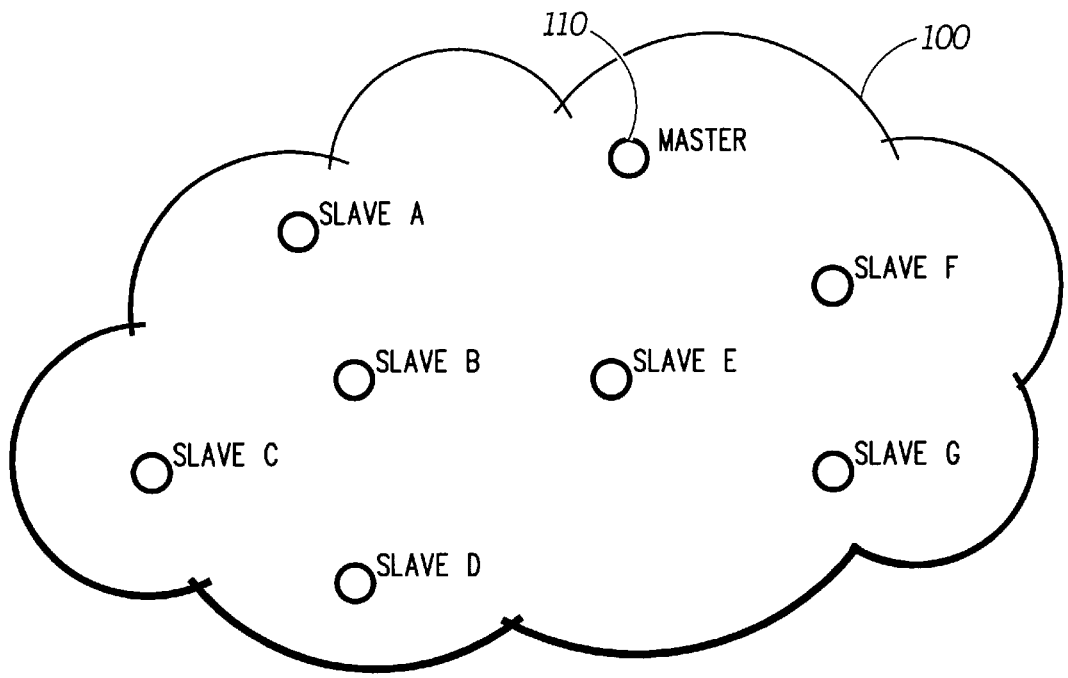
FIG. 1 shows a piconet with eight devices.

While this invention is susceptible of embodiment in many different forms, there is shown in the drawings and will herein be described in detail specific embodiments, with the understanding that the present disclosure is to be considered as an example of the principles of the invention and not intended to limit the invention to the specific embodiments shown and described. In the description below, like reference numerals are used to describe the same, similar or corresponding parts in the several views of the drawing.

Referring to FIG. 1, a piconet 100 is shown. Piconet 100 contains seven wireless-communication devices acting as slaves, and an eighth acting as master. The master wireless-communication device 110 initiates communication with the seven slave communication devices, and may also determine some aspects of each slave's communication parameters. Note that the master and slave are identical functionally. The master designation implies that the master wireless-communication device 110 initiates communication with the slave devices. Master 110 may also determine some parameters of the transmission between devices. In a preferred embodiment, master 110 dictates the channel assignments for the slave devices.

Figure 2:
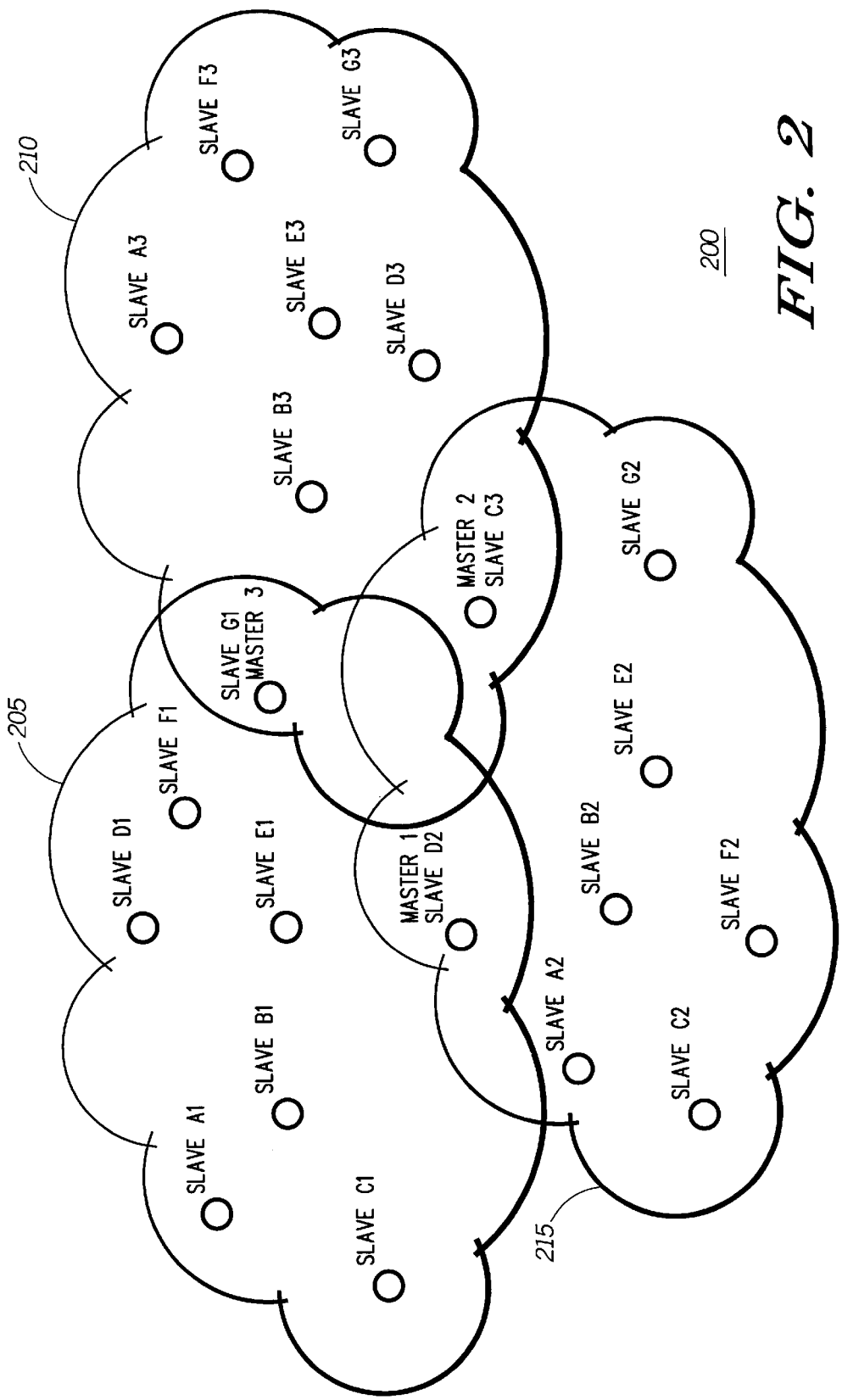
FIG. 2 illustrates a personal area network, comprising multiple piconets, which may be overlapping.

Piconet 100 is typically part of a larger network 200 containing multiple overlapping piconets, called a scatternet, as illustrated in FIG. 2. In FIG. 2, piconet 205 contains a master 1 and seven slaves, piconet 210 contains a master 2 and seven slaves, and piconet 215 contains a master 3 and seven slaves. While each master is responsible for the master-slave interactions within its own piconet, in a scatternet each piconet master also functions as a slave in a second piconet, enabling communication between piconets to take place.

Each device within a piconet contains a similar set of functionality for interacting with other wireless devices within the piconet. In the preferred embodiment, each device contains functionality sufficient to act as master or slave. Referring now to block diagram 300 of FIG. 3, a functional view of a representative wireless device 301 within piconet 100 is shown. Device 301 receives incoming messages 310, through message receiver 330, and processes the messages with processor 340 under the control of controller 350. Device timing is provided in block 360, while storage for the device is located in block 370. Outgoing messages 320 are transmitted by message transmitter 380. Controller 350 of each device contains link-management functionality as shown in block 355. The link manager, among other functions, sets the power-control strategy for device 301, and responds to, and generates, master-slave switching commands. These master and slave specific commands are processed by master processor 343 and slave processor 345 contained in processor 340. Timing block 360 provides the clocking and synchronization for the channel assignments selected by the processor 340. In the preferred embodiment, the timing block 360 also provides the reference clock for the generation of a random channel-hopping sequence. Storage block 370 stores location determination information 376 as well as tomography-related information 373. It will be recognized by one skilled in the art that the functionality represented in FIG. 3 is only representative of an external view of wireless device 301, and additional functionality may be added, or the described functionality may be combined, without departing from the spirit and scope of the present invention.

In order to perform peer-to-peer location, every device in the piconet must be able to communicate with its nearest neighbors and determine its relative distance. To accomplish this task in the preferred embodiment of the present invention, each device in the piconet must become a master at least once every cycle period. Depending on the application, the cycle period could range from once every 1.11 ms to as infrequent as once per day, or longer. As an example, the Bluetooth protocol states that only eight devices are permitted to participate in a piconet during a given time interval. One device must be marked as a master and the other seven must be marked as slaves. The master is responsible for initiating communications with its slaves and decides what devices can join the piconet.

The slaves are simply remote devices. If they need to have more control in the network, they request permission, from the master, to be the master. If permission is granted, the master device will acquire a new address and the requesting slave ("new" master) will assume the master's address and responsibilities. It should also be noted that in the preferred embodiment of the present invention, the master is primarily responsible for assigning addresses to the slave devices in the piconet.

In the preferred embodiment of the present invention, each device in piconet 100 must be able to become the master of the piconet on a periodic timeframe since each wireless device in the piconet must have the ability to collect ranging information with respect to other wireless devices in the piconet 105. Periodic switching of the slaves to become the master of the piconet may be either initiated by a slave or by the master of the piconet. Referring now to FIG. 4, a flowchart 400 that shows a technique for periodic switching, initiated by a slave of the piconet, is shown. Since each slave must become master on a regular timeframe, the current master is responsible to contacting each slave periodically to allow the slave to request the master position (block 410). At Block 420, the current master can agree or not agree, based upon predetermined criteria, to the slave's request to become the new master. If the current master agrees to the switch request, the slave will become the new master at Block 430. If the current master does not agree, the request is denied and the master and slave resume normal operation. The slave will have the opportunity at the next communication interval to make the same request. For instance, if the predetermined switching criteria is that the slave having the highest address becomes the next master, then the master will grant or deny the requesting slave's request on that basis. If the requesting slave has the highest address, its request will be granted. In such an example, the requesting slave with the highest address becomes master, and the old master is given the lowest address. The addresses of all other slaves might then be incremented by one, and the new master and new slave resume normal operation. This switching strategy ensures that each slave will eventually get the opportunity to act as master, thereby allowing each slave to collect the necessary information for location determination. Of course, the predetermined switching criteria may be based upon other factors, such as choosing the slave having the lowest address, for example.

In addition to the switching protocol being slave initiated, it may be initiated by the master of the piconet, as illustrated in flow 500 of FIG. 5. Without waiting for a request from a slave, and occurring in some periodic fashion, the master of the piconet will select the next master based upon some criteria, discussed above. The slave within the piconet that meets the criteria becomes the new master and the old master reverts back to normal, slave operation at Block 520.

Note that the strategy for switching just described is designed to allow each slave to become a master on a regular timeframe. Other switching strategies could be used without departing from the spirit and scope of the invention. For example, if the periodicity of the master-slave switch becomes synchronized with an undesirable and periodic RF signal, or other periodic phenomenon, one might chose to double the period of the master-slave switching by employing a master-slave switch using the largest address for the first half of the switching cycle and employing a smallest address master-slave switch for the last half of the switching cycle. A completely random switching scheme may be implemented by having the master-slave switch determined by the following equation:

> requesting slave("new" master)=last three bits of current master's clock MODULO (number of piconet devices)

Since, in the preferred embodiment, each device has a free running clock, all device clocks drift independently, and this will produce a random selection of slaves over time.

Figure 6:
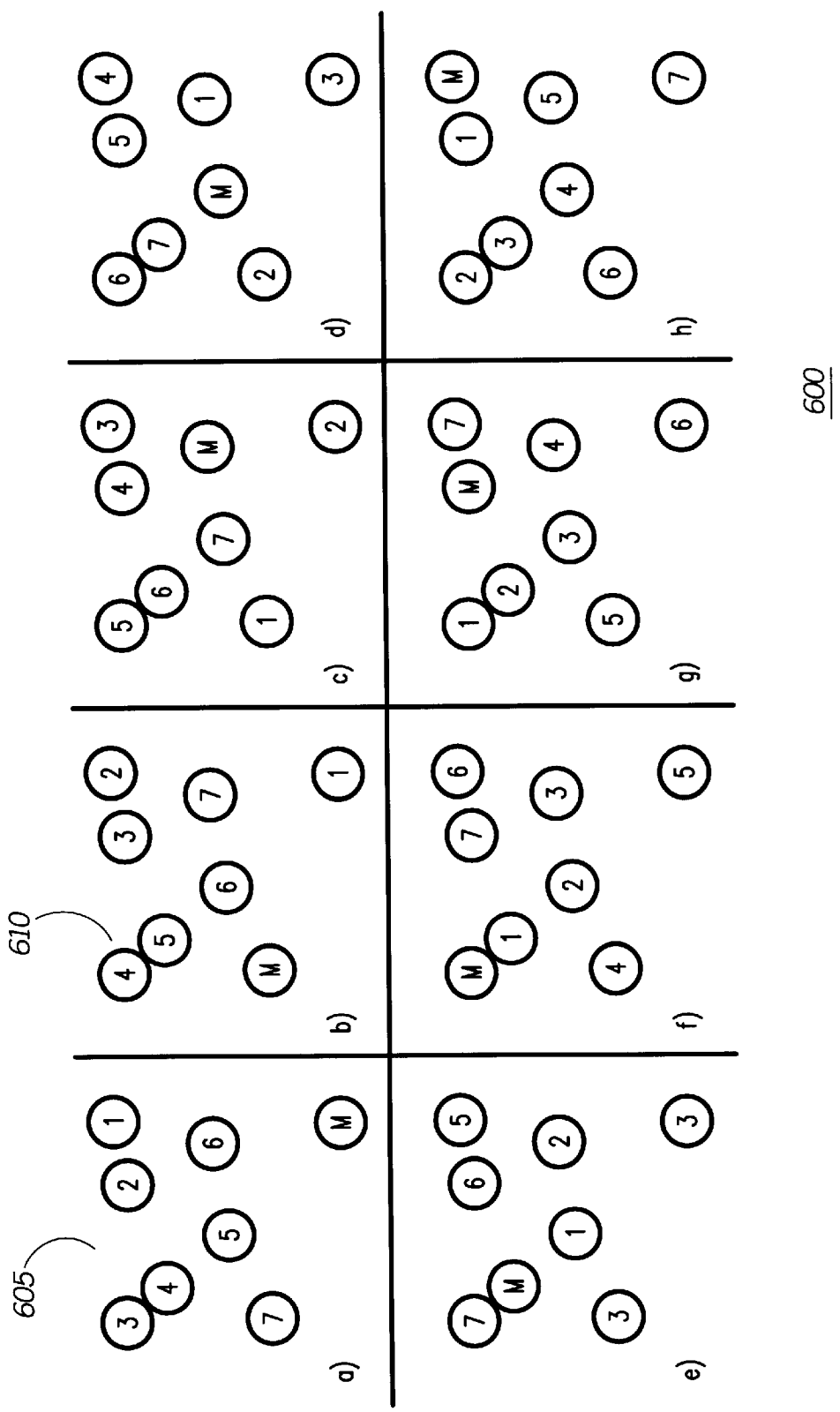
FIG. 6 shows the master-slave switching protocol of FIGS. 4 and 5, illustrating the order of each device becoming master in the piconet, according to the present invention.

To see how the master-slave switching strategy operates, consider the piconet 105 shown in FIG. 6 consisting of 8 devices (one master and seven slaves). Referring now to the upper left box 605 of the master-slave switching protocol 600 illustrated in FIG. 6, seven slaves in the upper half of the figure and one master in the bottom right corner of the figure. When a master-slave switch is initiated, the slave with the highest address, number seven, will become the "new" master, and the "old" master will assume an address of one. At this point, the master will assign new slave address by simply incrementing each slave's address by one. In the next master-slave switch 610, the device with the highest address will become the "new" master, and the "old" master will assume an address of one. All of the other device addresses will again be incremented by one. This process continues until every device has had an opportunity to become the master. This algorithm can be modified, and still accomplish the same task. For example, this algorithm may be modified such that the slave with the lowest address becomes the "new" master and the "old" master assumes the highest device address. Upon this switch, all other slave devices must decrement their address. This too will guarantee that every device will have an opportunity to become a master once every cycle.

According to the preferred embodiment, each device 301 in piconet 100 employs the master-slave relationship of the Bluetooth network to determine device location using Received Signal Strength Indicators (RSSI) and power control. The preferred embodiment of the present invention uses the frequency-hopping spread-spectrum nature of Bluetooth, combined with its fast hop rate (1600 hops/second) to detect the presence of multipath propagation and ameliorate its effects; these protocol features are also used for tomography determination as will be discussed.

Each slave in a piconet is synchronized in time with the master; slaves do not transmit when the master is scheduled to transmit. Since the present invention employs frequency-hopping spread-spectrum techniques, each transmission, whether by master or slave, occurs on a uniformly distributed pseudorandom channel selected from a collection of n possible channels. Over a sufficiently long time period, each member of a piconet should transmit on a given channel at least once. In the preferred embodiment, this even distribution of channel hopping across frequency is used to evaluate and potentially mitigate multipath-related channel impairments.

Figure 7:
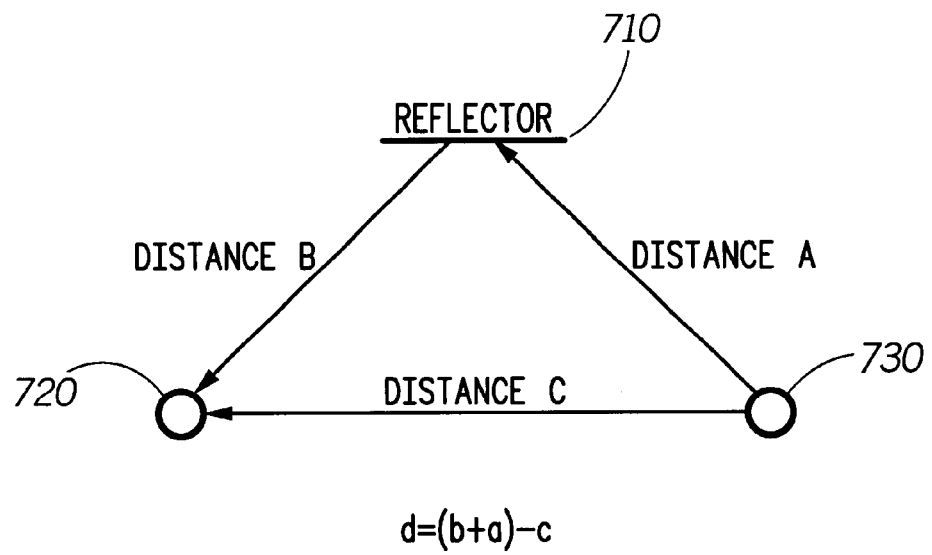
FIG. 7 shows a simple multi-path reflection, according to the present invention.

Referring now to diagram 700 of FIG. 7, a simple multipath example is shown. A reflector 710 is in the environment used for communication between a piconet device 720 and a second piconet device 730. Communication signals sent from the second piconet device 730 to the first piconet device 720 are reflected by reflector 710 and received at the first device 720. In addition to the reflected signal, the direct signal is also received. The presence of the multipath signal reduces the ability of the receiver of the first device 720 to recover the transmitted signal due to amplitude and phase distortion. A distance d, referred to as the path length difference, is the difference between the reflected path and the direct path, and provides an indication of how far away the reflector is from the two devices. So, if d can be accurately determined for several devices pairs, the location of a multipath reflector can be resolved.

Since it must regularly poll all slaves on the piconet, the Bluetooth master has available to it RSSI values for all slaves. To account for multipath affects, the master stores multiple RSSI values. Since the slave hops to a new, randomly selected frequency for each transmission, over time an RSSI vs. carrier frequency curve may be developed, as shown in the RSSI vs. carrier curve of FIG. 8. In the preferred embodiment, at least 79 possible random hop frequencies are used. Over a period of time, the curve may be developed during normal piconet operation if the piconet devices are assumed to move slowly, relative to the hop frequency.

Figure 8:
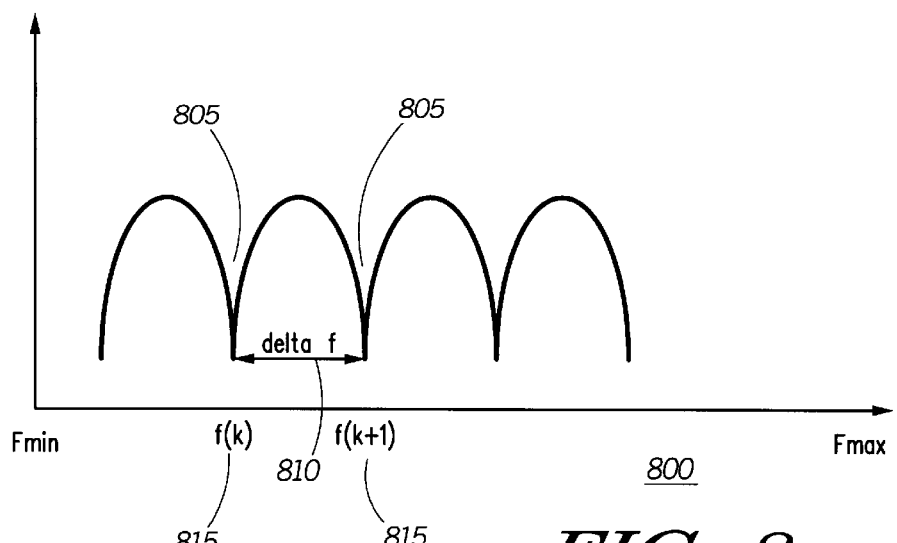
FIG. 8 shows a sample RSSI vs. carrier-frequency curve, according to the present invention.

As may be seen in FIG. 8, the RSSI vs. carrier-frequency curve for the case of a single reflection shows deep nulls 805 separated by a Δf 810. The nulls 805 can only occur when the difference in length between the direct and indirect paths, d=a+b−c, is a multiple of a half-wavelength, resulting in destructive interference. Note that if the attenuation in the two paths are unequal, the nulls will not be as deep as those of FIG. 8. Also, in the case of reflections from a perfect conductor, d will be an odd multiple of a half-wavelength; however, reflections from dielectrics at angles above their Brewster angle add an additional 180 degree phase delay, meaning d will be an even multiple of a half-wavelength. If perfect reflecting conductors are assumed, the null frequencies 815 are given by $$f(k+1)=300/\lambda(k+1)=300/(2d/(2k+1))=150(2k+1)/d$$
$$\text{MHz}, k=0,1,\ldots, n$$

For any adjacent pair of nulls, f(k+1)−f(k)=Δf=2/d.

Thus, by examining the RSSI vs. carrier-frequency curve 800 and determining the frequency separation 810 of the nulls 805, the path-length difference, d, may be determined. Using Minimum Mean Squared Error (MMSE), or an equivalent optimization routine, one can use these path length differences to determine the location of a network device and/or map the environment using tomographical techniques.

In accordance with the Bluetooth specification, the largest Δf detectable is slightly less than the 78 MHz separation of the Bluetooth bandedge channels-approximately 76.25 MHz. Thus the smallest path length difference discernible by the disclosed technique is 2/76.25 meters, or 2.62 cm (slightly more than an inch), when using Bluetooth. However, due to the need to have two nulls in the Bluetooth band, there are frequencies lower than this that are not detectable; the upper limit of continuous Δf coverage is slightly more than 39 MHz, or a path-length difference lower limit of 5.1 cm. The smallest Δf detectable with the disclosed invention is equal to twice the Bluetooth channel spacing, or 2 MHz. Thus the largest path-length difference discernible by the disclosed technique is 2/2=1 meter.

The nature of the reflecting material (i.e., whether it is conducting, or a dielectric material above its Brewster angle)

may be determined by noting the absolute frequency of any null. As stated above, nulls generated from conductors will be of the form $$f(k+1)=300/\lambda(k+1)=300/(2d/(2k+1))=150(2k+1)/d \text{ MHz}, \quad k=0,1,\ldots,n \quad (1)$$

Nulls generated from dielectrics above their Brewster angles will be of the form $$f(k+1)=300/\lambda(k+1)=150(2k)/d \text{ MHz}, k=0, 1, 2, \ldots, n \quad (2)$$

Since d and f(k+1) are known, information about the nature of the reflecting material is determined by which of these two equations is satisfied.

More complex multipath environments, involving multiple scatterers/reflectors, may be handled by evaluating the RSSI vs. carrier-frequency curve nulls 805 with Fourier techniques to identify the underlying periodicities. A Fourier transform applied to the RSSI vs. carrier-frequency curve will show underlying periodicities in the curve. These periodicities can then be exploited to determine the path-length difference d values of potential reflectors.

Figure 9:
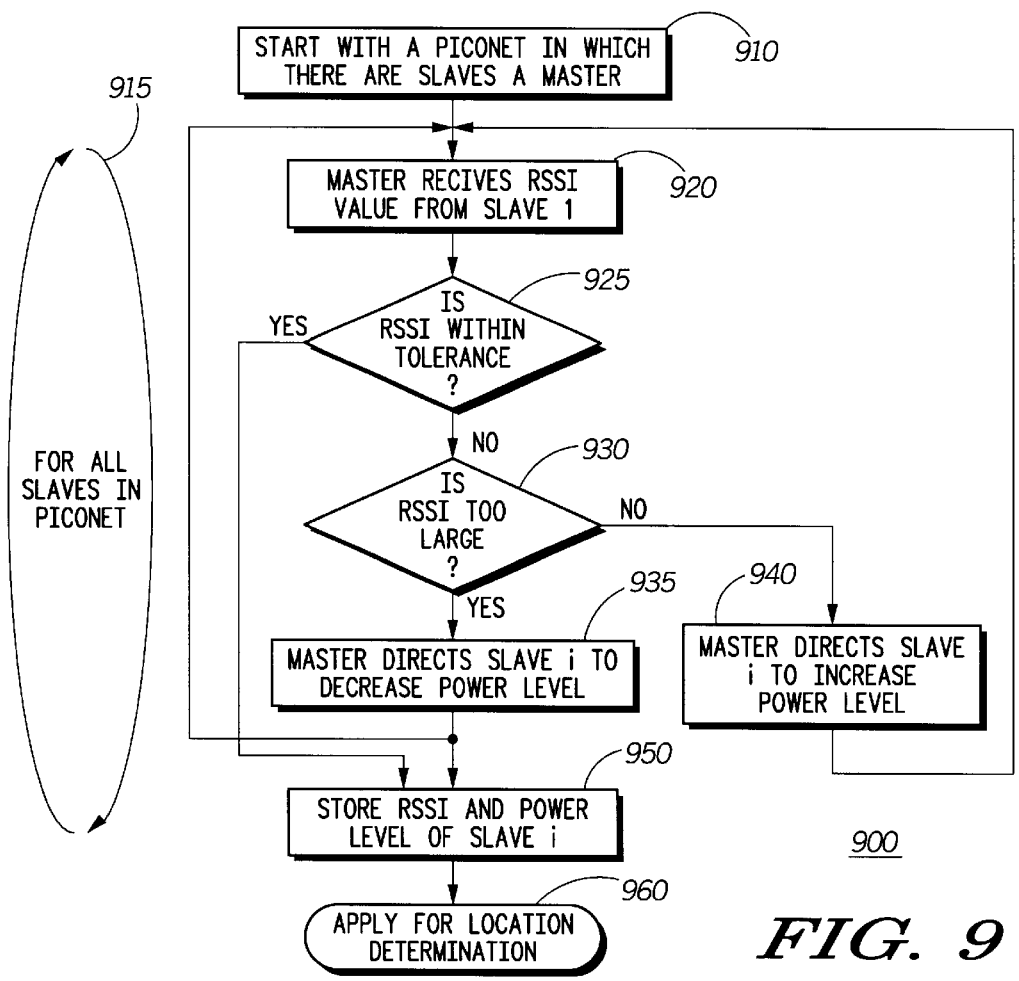
FIG. 9 is a power control flowchart between a master and slave for RSSI determination, according to the present invention.

In addition to the RSSI of each device, the power level of each device must be taken into account. Referring to FIG. 9, a flowchart 900 is shown that allows the master device to coordinate the received power level from each device in the piconet 915 having a number of slaves and a master, as indicated at block 910. The master receives an RSSI value from each slave in the piconet (block 920). If the RSSI is within tolerance (block 925), the RSSI value and power level of the slave is stored (block 950) and the next slave RSSI value is evaluated. If the RSSI value is too large (block 930), then the master directs the slave to reduce the power (block 935). The process then starts again at block 920. If the RSSI is too small (block 940), the master directs the slave to increase its power level (block 940). The process is again re-started at block 920. This looping structure continues until each slave has a power level within the tolerance set by the master. After the power control process is complete, the RSSI data can be used for location determination (block 960).

Figure 10:
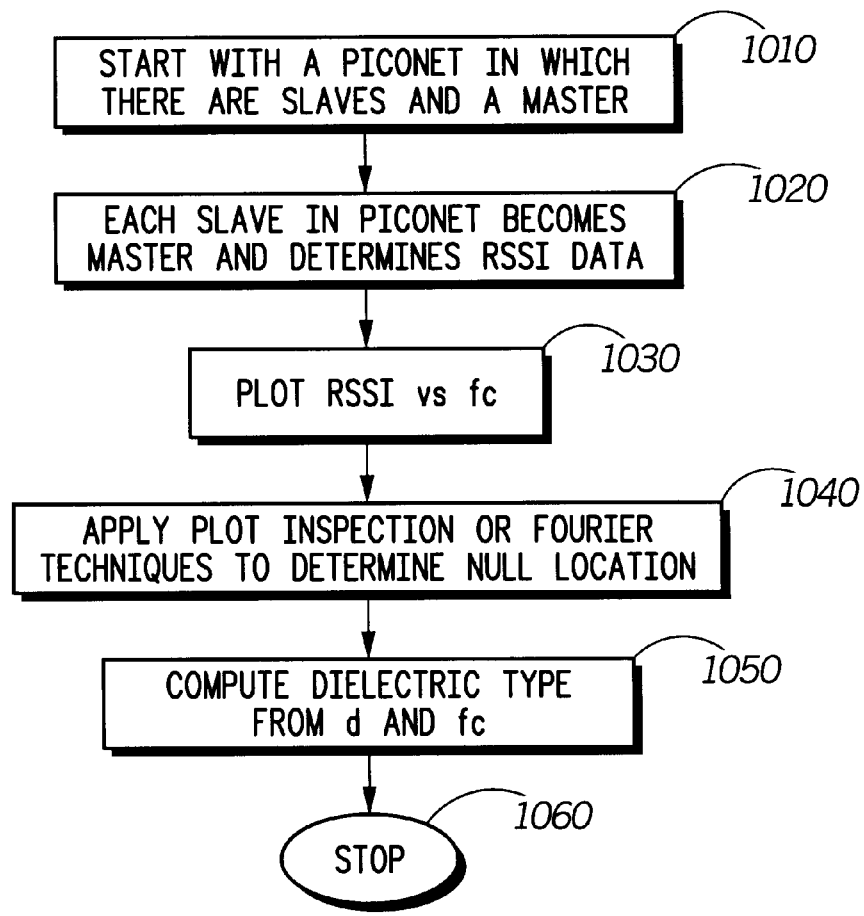
FIG. 10 is a flowchart for computing path length difference, according to the present invention.

Referring now to FIG. 10, a flow 1000 for determining the reflector material type is shown. After assigning the master and slave identities to the wireless devices in the piconet (block 1010), each slave in the piconet, in turn, becomes a master and collects RSSI and power-level data (block 1020). A plot of RSSI vs. fc (block 1030) is then created to allow the determination of the null locations using inspection or Fourier techniques if necessary (block 1040). Note that inspection implies a simple minima-detection algorithm, such as sorting the RSSI values into bins and determining the width between the two lowest bins. Fourier techniques include the Fast Fourier Transform (FFT) or Fourier series approaches, depending upon the number of frequencies and available computational power. Using the null location, the path-length difference, d, can be determined from the Δf value, and equations (1) and (2) are applied to determine the dielectric type of the reflector (block 1050).

Figure 11:
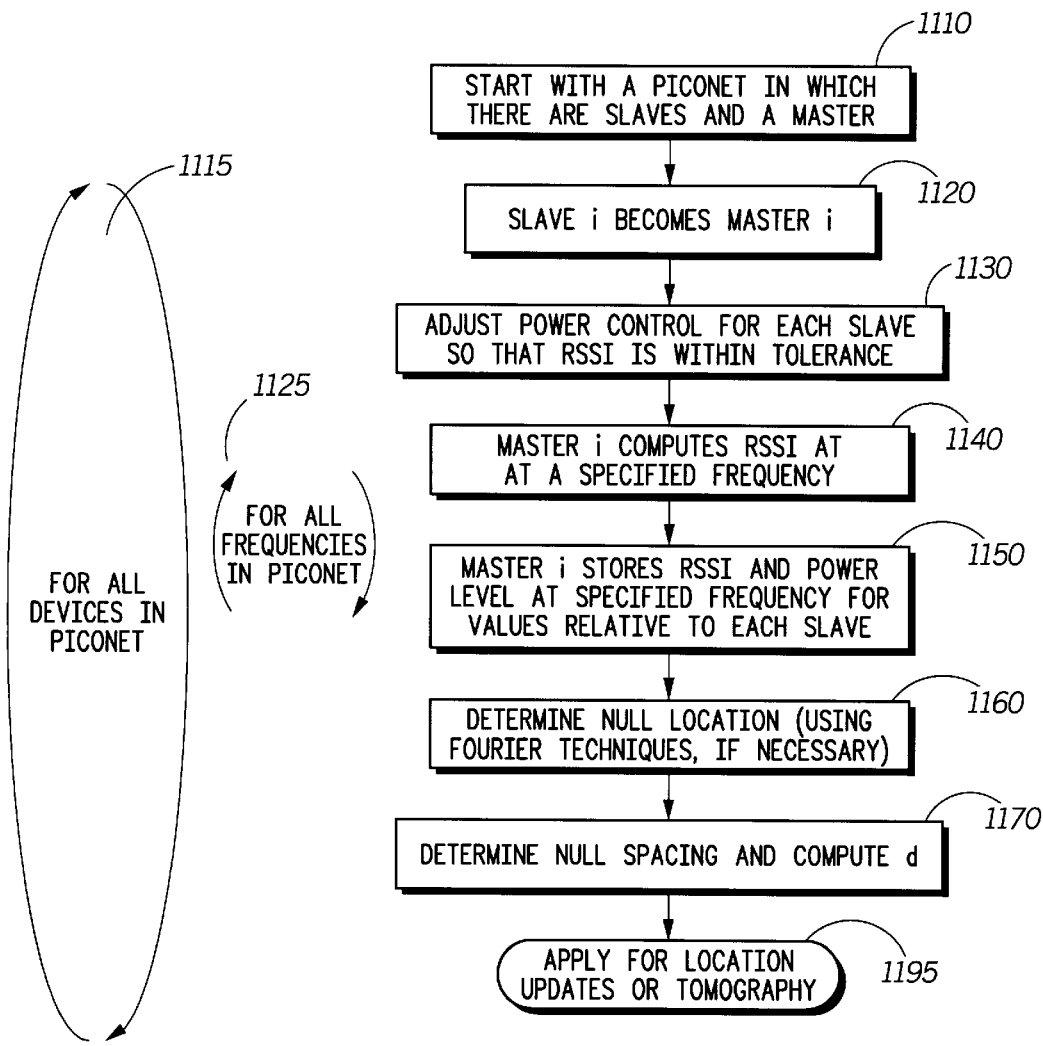
FIG. 11 depicts a location determination flow, according to the present invention.

Referring now to FIG. 11, a flowchart 1100 is shown that describes a method for a wireless device in the piconet 100, having a number of slave devices and a master device (block 1110), to determine its location. For each device within the piconet 100, the master-slave switching process is initiated so that slave i becomes master i (block 1120). The power control algorithm is then applied so that received RSSI values are within range (block 1130). Then, each device is given adequate time to cover all the hop frequencies, so that a stable RSSI vs. frequency curve is generated (block 1140). The master i stores these RSSI values from each slave of the piconet (block 1150), and uses this information to determine the null location (block 1160). The null information is used to compute the Δf value, and the path length difference, d (block 1170). This information is now applied for location updates or Tomography (block 1195). In the preferred embodiment of the present invention, due to the relatively poor tolerances of the Bluetooth system, the absolute accuracy of the resulting calculation may be only fair; however, the differential accuracy (i.e., the difference between successive location measurements) should be very good. There are 1600 Bluetooth slots per second, so location may be determined relatively often if needed in particular applications.

Figure 12:
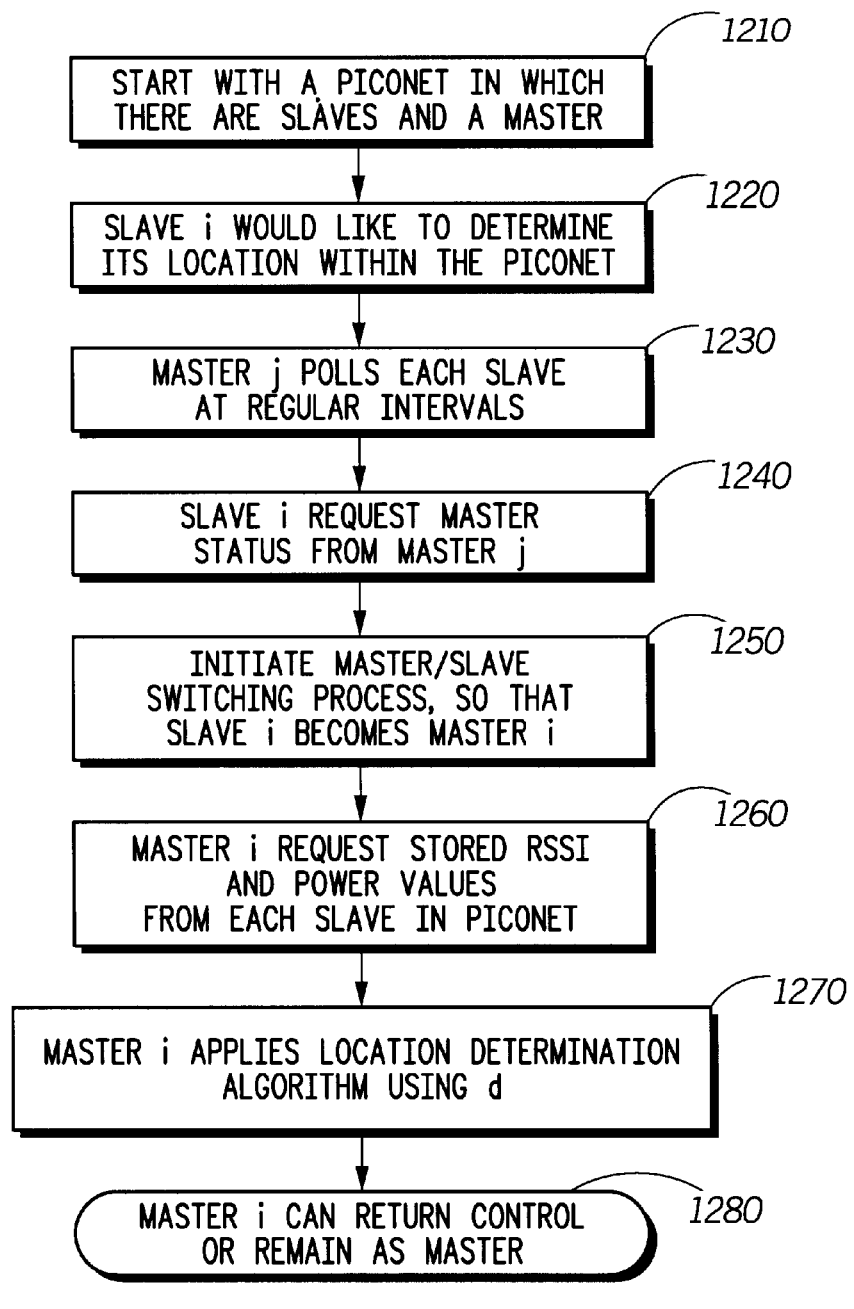
FIG. 12 is a flowchart for location determination when the device is a slave, according to the present invention.

For the following discussion, the notation "master k" or "master device k" will be used to reference the kth device of the piconet who has assumed master responsibilities, where k∈[i,j]. Referring now to flow 1200 of FIG. 12, a simplified view of the process of FIG. 11 is shown for the case of a single slave i, of a piconet having a master device and slave devices (block 1210), that would like to know its location with respect to the network (block 1220). The master device j of the piconet regularly polls each slave, typically every cycle, at block 1230. At block 1240, slave i requests master status from master j, which causes the master-slave switching process, discussed earlier, to be initiated so that slave i can become master i at block 1250. The new master i requests the stored RSSI and power values from each slave in the piconet at block 1260. At block 1270, master i applies the location-determination algorithm previously discussed to determine its location relative to the slave devices in the piconet. Master i can thereafter remain the master for awhile or relinquish this role upon request from a slave of the piconet.

Figure 13:
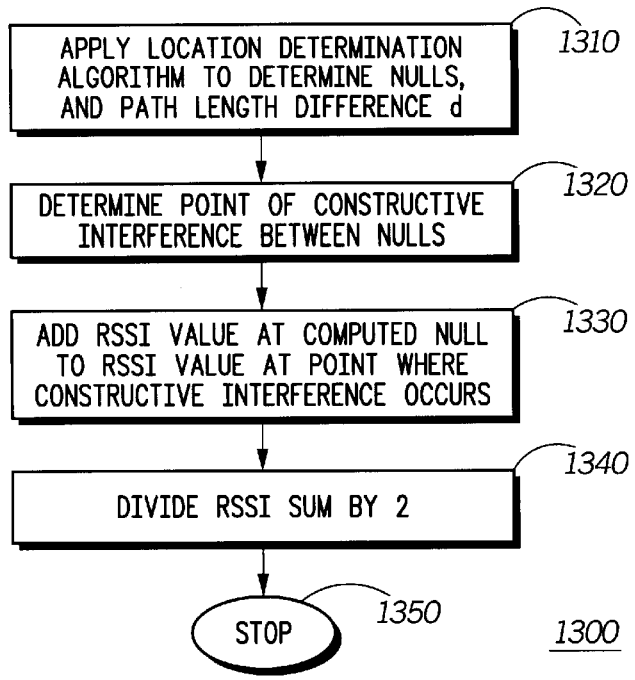
FIG. 13 is a flowchart for path-loss mitigation using multipath-interference detection, according to the present invention.

Referring now to the flow 1300 of FIG. 13, note that, since the disclosed invention allows multipath interference to be detected, its effects on path-loss calculations may be mitigated. In the case of a single reflection, for instance, one may determine the location of the nulls and calculate the path-length difference, d, (block 1310). Next a midpoint frequency at which constructive interference occurs is determined (block 1320). Next, the RSSI value at this midpoint is added to the RSSI value at the null (both in linear measure [i.e., not in dB]) to arrive at a RSSI sum (block 1330), which is divided by 2 (block 1340). This method will produce a more accurate RSSI-based distance measurement than measurements taken at a single frequency.

To make a tomograph of the piconet area, the location of each slave in the piconet is assumed. Referring now to the overall tomography flowchart 1400 of FIG. 14, the location-determining procedure described above is repeated for each device in the piconet (block 1410). Next, the RSSI and power-level data is used to determine the location of absorbers in the piconet (block 1420). Collecting the attenuation and absorption data allows an image of the piconet environment to be formed (block 1430).

Figure 14:
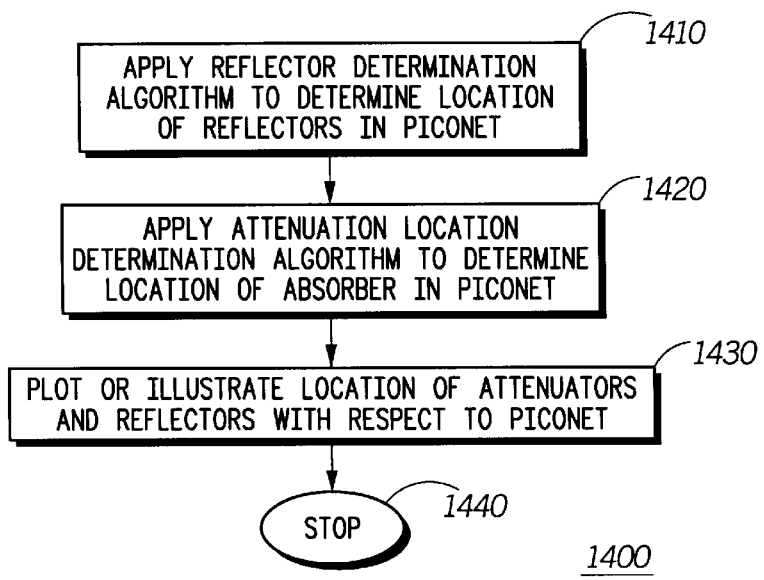
FIG. 14 is a flowchart for tomography computation, according to the present invention.
Figure 15:
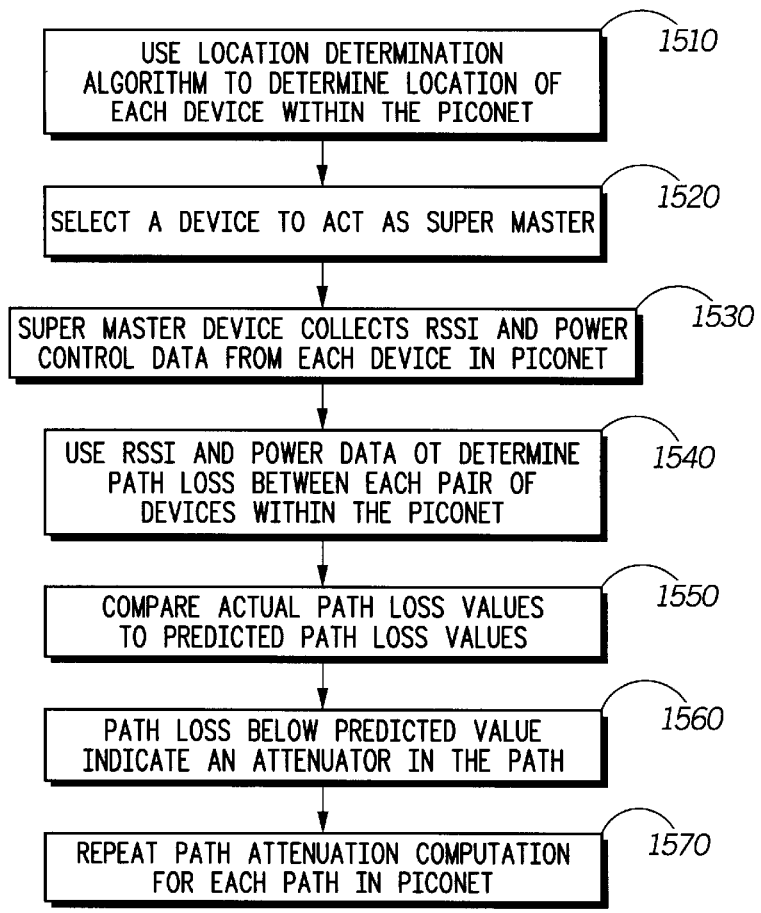
FIG. 15 is a flowchart showing how the determination of the piconet environment is done using absorbers and reflectors, according to the present invention.

Referring now to flow 1500 of FIG. 15, a technique for determining the location of the absorbers within the piconet is shown, alluded to in block 1420 of FIG. 14. First, the previously described location-determination algorithm (block 1510) is applied to determine the location of every device within the piconet. Upon completion, however, the RSSI and power control data from each device is collected by one of the devices of the piconet, which effectively becomes a "super master" (block 1520). That device, having effective path-loss data for all paths between all piconet devices(block 1530), as well as knowledge of the location of each device, now has the information needed to make a tomograph of the piconet area.

A tomograph is made by essentially performing the location calculations in reverse: Since the location of each device is known, the path-loss between any two devices (and, therefore, the associated RSSI and power control values) may be predicted (block 1540). The actual path-loss values are compared against the predicted path-loss values (block 1550); any loss below the predicted value indicates an attenuator in a path (block 1560). This path attenuation calculation is repeated for each path in the piconet (block 1570). Since the devices are usually placed on the area to be imaged, the paths intersect, and the location of the attenuator may be determined.

Figure 16:
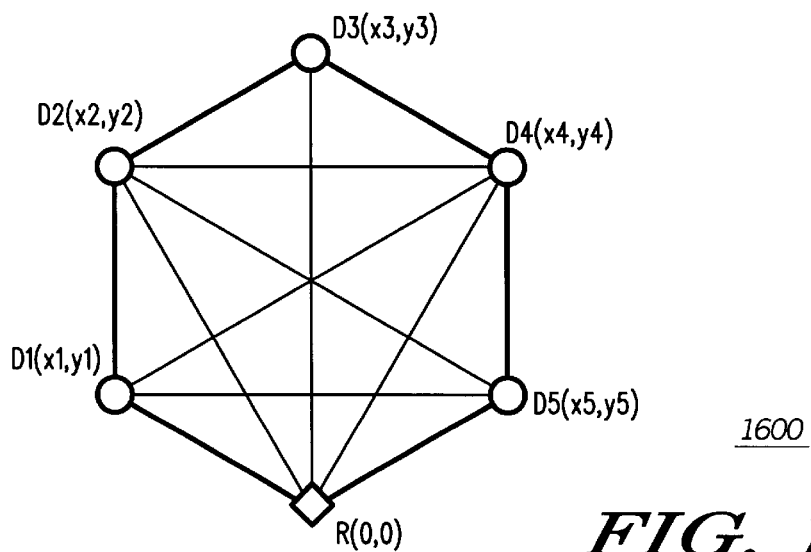
FIG. 16 is an example diagram showing reflector location determination using five devices of a piconet, according to the present invention.
Figure 17:
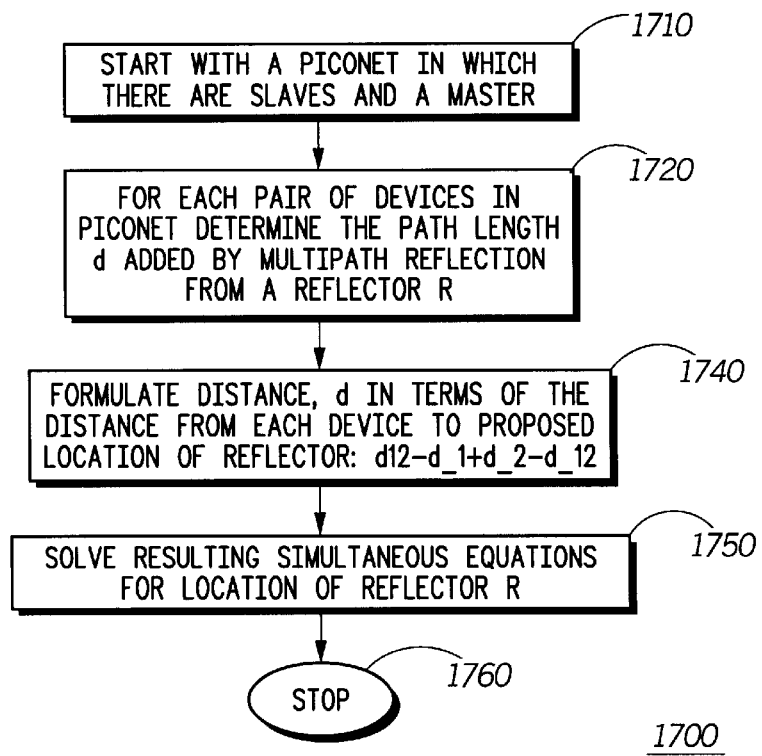
FIG. 17 is a reflector location flowchart, according to the present invention.

Referring now to the diagram 1600 of FIG. 16 and the flowchart 1700 of FIG. 17, that illustrate reflection location determination, a technique of using path loss information to locate a reflector, such as a radio reflector, is shown. Five devices D1, D2, D3, D4, and D5 and one reflector R are shown in FIG. 16. The communications path between each pair of devices has an estimated path length difference d based upon the location of this reflector R. The distance d, may be put in an equation in terms of the distance traveled by multipath term minus the distance between any two of the five devices (block 1740). Creating this relation for each pair of devices (block 1720), gives a set of simultaneous equations (block 1750), and these equations can be solved for the unknown location of reflector R since each of the five devices has a multipath component due to R. This technique is used in the creation of the tomography.

Referring again to the devices and reflector shown in sample piconet 1600 of FIG. 16, construction of a set of simultaneous set of equations and their solution will now be explored in more detail. $d_{ij}$ is defined as the difference in distance between the indirect and direct paths between Bluetooth devices i and j, an extension of the definition of difference path length d previously discussed. Further, d(a, b;c,d) is defined as the distance between points (a,b) and (c,d) on a location coordinate system, equal to sqrt($(a-c)^2+(b-d)^2$). As shown in FIG. 16, the piconet 1600 is within range of a radio reflector R; the reflector is placed at the origin of the location coordinate system (i.e., at location (0,0)).

From the definition of d $d_{ij}$, $$d_{ij}=d(x_i,y_i;0,0)+d(x_j,y_j;0,0)-d(x_j,y_j;x_i,y_i),$$

where device i is at location ($x_i,y_i$) and device j is at location ($x_j,y_j$), a system of equations describing $d_{ij}$ for all devices of the piconet can be established in which the x and y coordinates of for each intra-piconet device can then be solved. As it happens, a minimum of five devices are needed to solve the two dimensional case (seven are needed for three dimensions):

$$d_{12}=d(x_1,y_1;0,0)+d(x_2,y_2;0,0)-d(x_2,y_2;x_1,y_1)$$

$$d_{23}=d(x_2,y_2;0,0)+d(x_3,y_3;0,0)-d(x_3,y_3;x_2,y_2)$$

$$d_{34}=d(x_3,y_3;0,0)+d(x_4,y_4;0,0)-d(x_4,y_4;x_3,y_3)$$

$$d_{45}=d(x_4,y_4;0,0)+d(x_5,y_5;0,0)-d(x_5,y_5;x_4,y_4)$$

$$d_{13}=d(x_i,y_1;0,0)+d(x_3,y_3;0,0)-d(x_3,y_3;x_1,y_1)$$

$$d_{14}=d(x_1,y_1;0,0)+d(x_4,y_4;0,0)-d(x_4,y_4;x_1,y_1)$$

$$d_{15}=d(x_1,y_1;0,0)+d(x_5,y_5;0,0)-d(x_5,y_5;x_1,y_1)$$

$$d_{24}=d(x_2,y_2;0,0)+d(x_4,y_4;0,0)-d(x_4,y_4;x_2,y_2)$$

$$d_{25}=d(x_2,y_2;0,0)+d(x_5,y_5;0,0)-d(x_5,y_5;x_2,y_2)$$

$$d_{35}=d(x_3,y_3;0,0)+d(x_5,y_5;0,0)-d(x_5,y_5;x_3,y_3)$$

Many tools are available to solve this system of equations; one such method is to note that each of these equations is of the form:

$$d_i=f_i(x_a,y_a,x_b,y_b)$$

From these equations, the Mean Square Error (MSE) is defined as:

$$Err = \frac{1}{N} \cdot \sum_{i=1}^{N}(f_i - d_i)^2$$

where N is the number of equations. By minimizing the mean square error (MMSE), we can get the solutions of these equations, thereby yielding the locations of the devices D1, D2, D3, D4, and D5 of the piconet.

Figure 18:
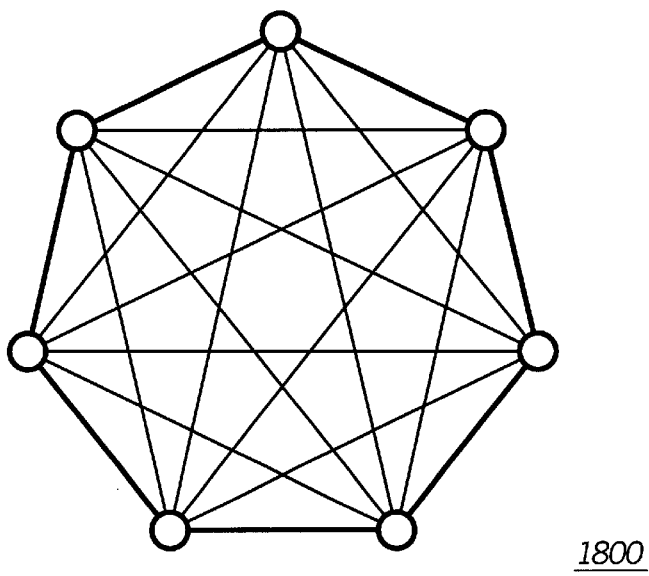
FIG. 18 is an example diagram showing attenuator location determination using seven devices of a piconet, according to the present invention.
Figure 19:
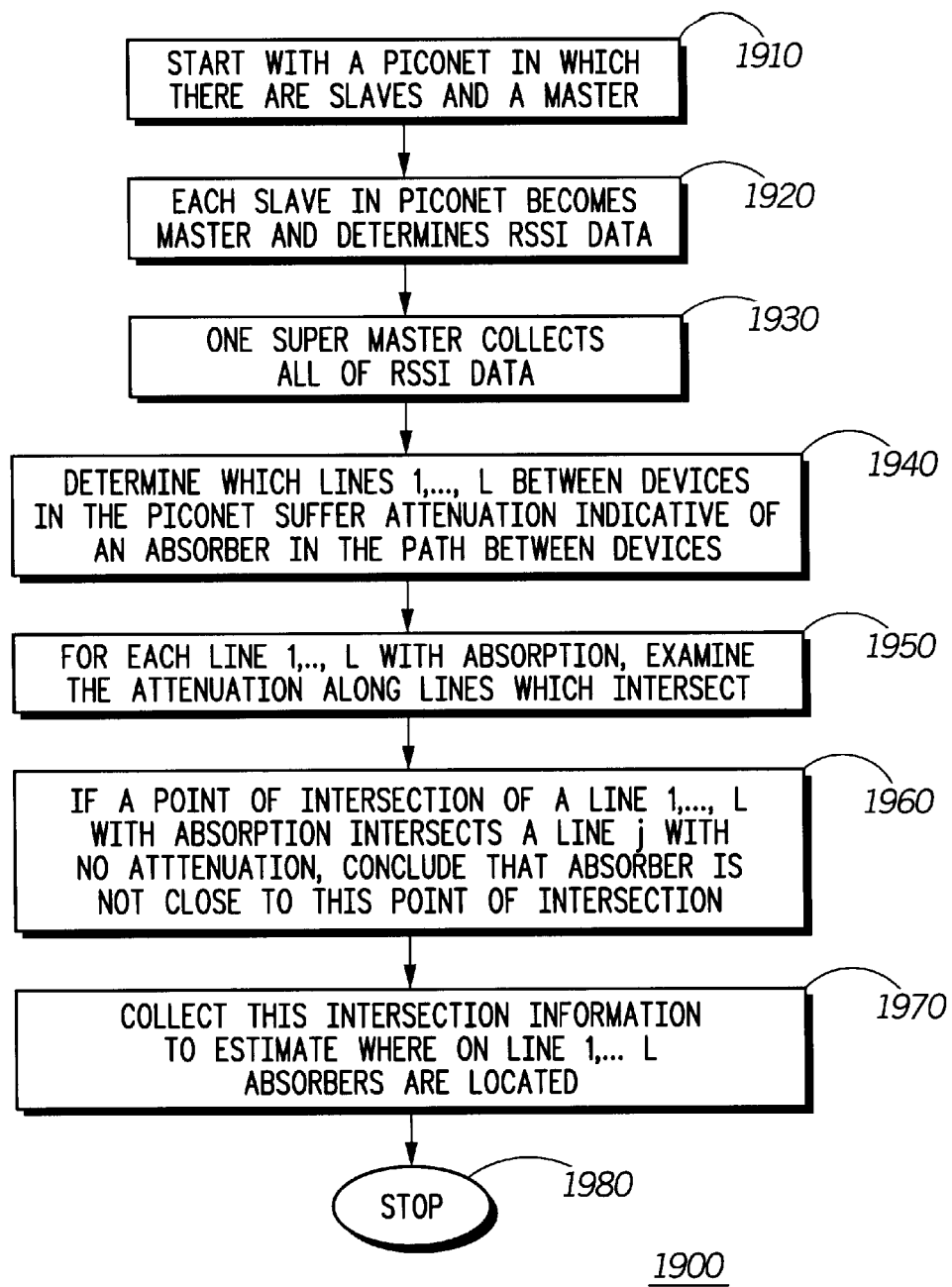
FIG. 19 is an attenuator location flowchart, according to the present invention.

Referring now to piconet 1800 of FIG. 18 and flow 1900 of FIG. 19, a technique for reducing the uncertainty in locating absorbers within a piconet is shown according to the present invention. The seven wireless devices of the piconet shown in FIG. 18 each determine the RSSI data and path loss data by becoming master in turn (block 1920). One of the seven devices, serving as a super master device, collects all the RSSI (block 1930), and determines which, if any, paths between any two pairs of devices suffer attenuation, thereby indicating that one or more absorber are present in the affected paths (block 1940). Then, for each path or line that contains an absorber, the other lines that intersect it are in turn checked for attenuation (block 1950). Lines of intersection without attenuation provide an indication that the attenuator is not close to that point of intersection (block 1960). Grouping this information on each attenuated path gives an improved estimate of the locations of any absorbers within the piconet (1970).

While the invention has been described in conjunction with specific embodiments, it is evident that many alternatives, modifications, permutations and variations will become apparent to those of ordinary skill in the art in light of the foregoing description. Accordingly, it is intended that the present invention embrace all such alternatives, modifications and variations as fall within the scope of the appended claims.

What is claimed is:

1. A method of intra-piconet device location, comprising:
   a) a master device periodically polling a plurality of slave devices of a piconet over a period of time to obtain range information for each slave device of the plurality of slave devices corresponding to a plurality of carrier frequencies over a carrier-frequency range, wherein the range information for each slave device comprises received signal strength indicator (RSSI) values;
   b) developing a (RSSI) vs. carrier-frequency curve of each slave device of the plurality of slave devices representative of a plurality of RSSI values corresponding to the plurality of carrier frequencies over the period of time contained in the range information;
   c) identifying one or more periodicities occurring in the RSSI vs. carrier-frequency curve of each slave device of the plurality of slave devices;
   d) for each slave device of the plurality of slave devices identifying a frequency separation Δf corresponding to the one or more periodicities; and e) using the frequency separation Δf in determining a path-length difference, d=a+b−c, between a direct path distance c from a slave device of the plurality of slave devices to the master device and an indirect path distance, a+b, from the slave device to the master device, wherein d is proportional to Δf.

2. The method of claim 1, wherein each slave device of the plurality of slave devices is polled at least once during the period of time.

3. The method of claim 1, wherein the one or more periodicities are the minima of the RSSI vs. carrier-frequency curve.

4. The method of claim 1, further comprising:
determining whether the reflecting object is one of a conducting object or a dielectric object;
wherein if the reflecting object is a conducting object, a higher null of the adjacent pair of nulls is given by: $f_{k+1}=300/\lambda_{k+1}=150(2k+1)/d$ MHz, for an integer k;
wherein if the reflecting object is a dielectric object, a higher null of the adjacent pair of nulls is given by: $f_{k+1}=300/\lambda_{k+1}=150(2k)/d$ MHz, for the integer k.

5. The method of claim 1, wherein the range information for each slave device of the plurality of slave devices comprises power values.

6. The method of claim 5, further comprising:
adjusting the power level of each slave of the plurality of slaves in order to provide the master device with consistent RSSI information.

7. The method of claim 6, wherein adjusting the power level of each slave further comprises:
if a power level of the RSSI value received by the master device from a slave of the plurality of slaves is not within an acceptable power range, determining whether the power level RSSI value is lower than or higher than the acceptable power range;
if the power level of the RSSI value is too high to be within the acceptable power range, the slave device reducing the power of the slave device in response to a power decrease request from the master device; and
if the power level of the RSSI value is too low to be within the acceptable power range, the slave device increasing the power of the slave device in response to a power increase request from the master device.

8. The method of claim 1, further comprising tomography generation that comprises:
using a master-slave switching protocol to ensure that each device of the piconet is the master device at least once and repeating a)–e) for each device in order to determine the location of each device and any reflectors of the piconet;
collecting the range information of each slave device and the master device of the piconet;
using the range information of each slave device and the master device to determine predicted path losses between the plurality of slave devices and the master device of the piconet;
comparing the predicted path losses to measured path losses between the plurality of slave devices and the master device of the piconet, wherein a loss of a measured path loss of the measured path losses below a predicted path loss of the predicted path losses indicates an attenuator in a corresponding path.

9. The method of claim 8, wherein the master-slave switching protocol comprises:
a requesting slave device requesting to become the master device of the piconet;
if the master device agrees to the switching request of the requesting slave device, a qualified slave device that meets predetermined criteria becoming a new master device and the master device becoming one of the slave devices of the piconet.

10. The method of claim 9, wherein the criteria of the qualified slave device is that the qualified slave device has a highest address of the plurality of slave devices and after the master device becomes one of the slave devices, the master device having a lowest address of the plurality of slave devices.

11. The method of claim 10, further comprising incrementing the addresses of the plurality of slave devices after the qualified slave device becomes the new master device.

12. The method of claim 8, wherein the range information is collected by a supermaster device of the devices of the piconet.

13. A piconet of a wireless communication network capable of intra-piconet device location, comprising:
a plurality of slave devices of the piconet;
a master device of the piconet coupled to the plurality of slave devices that is operable to periodically poll the plurality of slave devices over a period of time to obtain range information for each slave device of the plurality of slave devices corresponding to a plurality of carrier frequencies over the carrier-frequency range, identify for each slave device of the plurality of slave devices a frequency separation Δf corresponding to one or more periodicities occurring in a RSSI vs. carrier-frequency curve of each slave device of the plurality of slave devices, and determine from the frequency separation Δf a path-length difference, d=a+b−c, between a direct path distance c from a slave device of the plurality of slave devices to the master device and an indirect path distance, a+b, from the slave device to the master device,
wherein the (RSSI) vs. carrier-frequency curve is developed for each slave device of the plurality of slave devices representative of a plurality of RSSI values corresponding to the plurality of carrier frequencies over the period of time contained in the range information, and wherein d is proportional to Δf.

14. The piconet of claim 13, wherein the range information for each slave device comprises received signal strength indicator (RSSI) values.

15. The piconet of claim 13, wherein the master device polls each slave device of the plurality of slave devices at least once during the period of time.

16. The piconet of claim 13, wherein the one or more periodicities are the minima of the RSSI vs. carrier frequency curve.

17. The piconet of claim 13, wherein the master device is further operable to determine whether the reflecting object is one of a conducting object or a dielectric object; and
wherein if the reflecting object is a conducting object, a higher null of the adjacent pair of nulls is given by: $f_{k+1}=300/\lambda_{k+1}=150(2k+1)/d$ MHz, for an integer k, and if the reflecting object is a dielectric object, a higher null of the adjacent pair of nulls is given by: $f_{k+1}=300/\lambda_{k+1}=150(2k)/d$ MHz, for the integer k.

18. The piconet of claim 13, wherein the range information for each slave device of the plurality of slave devices comprises power values.

19. The piconet of claim 18, wherein the master device is further operable to adjust the power level of each slave of the plurality of slaves in order to obtain consistent RSSI information.

20. The piconet of claim 19, wherein if a power level of the RSSI value received by the master device from a slave of the plurality of slaves is not within an acceptable power range, the master device determines whether the power level RSSI value is lower than or higher than the acceptable power range;

if the power level of the RSSI value is too high to be within the acceptable power range, the slave device reduces the power of the slave device in response to a power decrease request from the master device; and if the power level of the RSSI value is too low to be within the acceptable power range, the slave device increases the power of the slave device in response to a power increase request from the master device.

21. The piconet of claim 13, wherein the master device is further operable to perform tomography generation comprising:

using a master-slave switching protocol to ensure that each device of the piconet is the master device at least once in order to determine the location of each device and any reflectors of the piconet;

collecting the range information of each slave device and the master device of the piconet;

using the range information of each slave device and the master device to determine predicted path losses between the plurality of slave devices and the master device of the piconet; and comparing the predicted path losses to measured path losses between the plurality of slave devices and the master device of the piconet, wherein a loss of a measured path loss of the measured path losses below a predicted path loss of the predicted path losses indicates an attenuator in a corresponding path.

22. The piconet of claim 21, wherein the master-slave switching protocol comprises:

a requesting slave device requesting to become the master device of the piconet; and if the master device agrees to the switching request of the requesting slave device, a qualified slave device that meets a criteria becoming a new master device and the master device becoming one of the slave devices of the piconet.

23. The piconet of claim 22, wherein the criteria of the qualified slave device is that the qualified slave device has a highest address of the plurality of slave devices and after the master device become one of the slave devices, the master device having a lowest address of the plurality of slave devices.

24. The piconet of claim 23, further comprising incrementing the addresses of the plurality of slave devices after the qualified slave device becomes the new master device.

25. The piconet of claim 21, wherein the range information is collected by a supermaster device of the devices of the piconet.

26. A device operable in a piconet of a wireless communication network, comprising:

a controller element having a link management element that controls a power level of the device and controls switching of the device between a master mode and a slave mode, wherein while in the slave mode the device switches to the master mode only upon receiving permission from a master device of the piconet;

a receiver element operable to receive incoming messages to the device;

a processor element, coupled to the receiver element and having a master processor operational in the master mode and a slave processor operational in the slave mode, that is controlled by the controller element to process the incoming messages, generate outgoing messages of the device, and select channel assignments of the device;

a transmitter element coupled to the processor element and operable to transmit the outgoing messages of the device;

a timing element coupled to the receiver element, the transmitter element, the controller element, and the processor element that provides timing for the channel assignments of the device;

a storage element coupled to processor element and the timing element;

wherein in the master mode the device is operable to periodically poll a plurality of slave devices of the piconet to obtain range information for each slave device of the plurality of slave devices corresponding to a plurality of carrier frequencies over the carrier-frequency range, identify for each slave device of the plurality of slave devices a frequency separation $\Delta f$ corresponding to one or more periodicities occurring in a RSSI vs. carrier-frequency curve of each slave device of the plurality of slave devices, and determine from the frequency separation $\Delta f$ a path-length difference, $d=a+b-c$, between a direct-path distance c from a slave device of the plurality of slave devices to the master device and an indirect-path distance, $a+b$, from the slave device to the master device, wherein in the master mode the device develops the (RSSI) vs. carrier-frequency curve of each slave device of the plurality of slave devices representative of a plurality of RSSI values corresponding to the plurality of carrier frequencies over the period of time contained in the range information, and wherein d is proportional to $\Delta f$, and wherein in the slave mode the device is operable to provide range information of the device corresponding to the plurality of carrier frequencies over the carrier-frequency range.

27. The device of claim 26, wherein the range information for each slave device comprises received signal strength indicator (RSSI) values.

28. The device of claim 26, wherein while in the master mode the device polls each slave device of the plurality of slave devices at least once during the period of time.

29. The device of claim 26, wherein the one or more periodicities are the minima of the RSSI vs. carrier-frequency curve.

30. The device of claim 26, wherein while in the master mode, the device is further operable to determine whether the reflecting object is one of a conducting object or a dielectric object; and wherein if the reflecting object is a conducting object, a higher null of the adjacent pair of nulls is given by: $f_{k+1}=300/\lambda_{k+1}=150(2k+1)/d$ MHz, for an integer k and if the reflecting object is a dielectric object, a higher null of the adjacent pair of nulls is given by: $f_{k+1}=300/\lambda_{k+1}=150(2k)/d$ MHz, for the integer k.

31. The device of claim 26, wherein the range information for each slave device of the plurality of slave devices comprises power values.

32. The device of claim 31, wherein while in the master mode the device is further operable to adjust the power level of each slave of the plurality of slaves in order to obtain consistent RSSI information.

33. The device of claim 32, wherein if a power level of the RSSI value received by the device from a slave of the plurality of slaves is not within an acceptable power range, the device determines whether the power level RSSI value is lower than or higher than the acceptable power range;

if the power level of the RSSI value is too high to be within the acceptable power range, the slave device reduces the power of the slave device in response to a power decrease request from the device; and if the power level of the RSSI value is too low to be within the acceptable power range, the slave device increases the power of the slave device in response to a power increase request from the device.

34. The device of claim 26, wherein while in the master mode the device is further operable to perform tomography generation comprising:

using a master-slave switching protocol to ensure that each slave device of the plurality of slave devices of the piconet is a master device at least once in order to determine the location of each device of the piconet and any reflectors of the piconet;

collecting the range information of each slave device and the device of the piconet;

using the range information of each slave device and the device to determine predicted path losses between the plurality of slave devices and the device of the piconet; and comparing the predicted path losses to measured path losses between the plurality of slave devices and the device of the piconet, wherein a loss of a measured path loss of the measured path losses below a predicted path loss of the predicted path losses indicates an attenuator in a corresponding path.

35. The device of claim 34, wherein the master-slave switching protocol comprises:

a requesting slave device requesting to become the master device of the piconet; and if the requesting slave device meets a criteria and the device agrees to the switching request of the requesting slave device, the requesting slave device becoming a new master device and the device becoming one of the slave devices of the piconet.

36. The device of claim 35, wherein the criteria is that the requesting slave device has a highest address of the plurality of slave devices and after the device become one of the slave devices, the device having a lowest address of the plurality of slave devices.

37. The device of claim 36, further comprising incrementing the addresses of the plurality of slave devices after the requesting slave device becomes the new master device.

38. The device of claim 26, wherein the timing element provides a reference clock of the device for generation of a random channel hopping sequence of the device.

* * * * *